United States Patent

Shapiro et al.

Patent Number: 6,054,157
Date of Patent: Apr. 25, 2000

[54] COOKIE DOUGH STORAGE-DISPENSING SYSTEM AND METHOD

[76] Inventors: Nancy B. Shapiro; Joseph H. Shapiro, both of 4350 Leatherwood Ter., Burtonsville, Md. 20866

[21] Appl. No.: 09/092,971
[22] Filed: Jun. 8, 1998
[51] Int. Cl.[7] .................................................. B65D 85/00
[52] U.S. Cl. ........................... 426/111; 426/115; 222/325; 222/386; 222/394
[58] Field of Search .................................... 426/111, 448, 426/516, 394, 115; 222/325, 326, 386, 394

[56] References Cited

U.S. PATENT DOCUMENTS

| | | | |
|---|---|---|---|
| 2,691,982 | 10/1954 | Jones | 128/261 |
| 2,870,022 | 1/1959 | Anderson et al. | 99/172 |
| 3,504,826 | 4/1970 | Carlton | 222/82 |
| 3,984,033 | 10/1976 | Groth et al. | 222/333 |
| 4,106,534 | 8/1978 | Johnson | 141/18 |
| 4,114,781 | 9/1978 | Doyel | 222/326 |
| 4,323,176 | 4/1982 | Sartain | 222/326 |
| 4,381,315 | 4/1983 | Yong et al. | 426/94 |
| 4,456,450 | 6/1984 | Heling | 425/376 R |
| 4,826,047 | 5/1989 | Heflin | 222/136 |
| 5,052,593 | 10/1991 | Grome et al. | 222/333 |

OTHER PUBLICATIONS

Maruti Easy Kitchen Press, purchased in India Nov. 1997, includes 13 dies, 12 depicted, 1 die blank.

The Mirro Company, Cookie/Pastry Press, Directions and Recipes Guide.

Primary Examiner—Nina Bhat
Attorney, Agent, or Firm—Roylance,Abrams,Berdo & Goodman, L.L.P.

[57] ABSTRACT

A reusable cookie dough storage container for storing and refrigerating cookie dough comprising a generally tubular, hollow member having a self-sustaining shape and a substantially uniform cross-section substantially along its entire length is provided with a piston slidably received in the tubular member and axially movable therein along a longitudinal axis of the tubular member. The tubular member has at least a first end cap releasably received on a longitudinal end of the tubular member, such that the first end cap and the piston form a cookie dough storage chamber within the tubular member when spaced apart. The piston is adapted to substantially seal the storage chamber containing the cookie dough, when used in combination with the first end cap, and to apply a positive pressure on the cookie dough stored within the storage chamber for extruding said cookie dough from the storage chamber when the first end cap is removed.

17 Claims, 1 Drawing Sheet

COOKIE DOUGH STORAGE-DISPENSING SYSTEM AND METHOD

FIELD OF THE INVENTION

The present invention relates to a cookie dough refrigeration storage and dispensing system, and to the method of using such storage-dispenser. More particularly, this invention relates to a cookie dough storage and refrigeration system in which a tubular storage member is provided that can be reused and is self-sustaining in the refrigerator.

BACKGROUND OF THE INVENTION

U.S. Pat. No. 2,870,022 Anderson et al. discloses a flexible dough mix package for prepared cookie dough which can be frozen and sliced for baking. Such package requires metal rings to provide a hermetic seal.

Currently, bakers of homemade cookie dough store the homemade dough in flexible plastic wrap. This results in the dough absorbing food odors of the refrigerator or freezer, and becoming freezer-burned and unusable during storage before it can be used to bake cookies. Additionally, flexible plastic-wrapped cookie dough can be flattened or otherwise damaged in the refrigerator or freezer from contact with other food items. Furthermore, plastic wrap is normally disposed of after a single use thereby contributing to environmental problems.

SUMMARY OF THE INVENTION

A reusable cookie dough storage container for storing, refrigerating and dispensing cookie dough has now been found, which comprises a generally tubular, hollow member having a substantially self-sustaining shape and a generally uniform cross-section substantially along its entire length having a piston slidably received in the tubular member and axially movable therein along a longitudinal axis of the tubular member. The tubular member has at least a first end cap releasably received on a longitudinal end of said tubular member, such that the first end cap and the piston form a cookie dough storage chamber within the tubular member when the end cap and the piston are spaced apart.

The piston serves to both substantially seal one end of the storage chamber containing the cookie dough, while the first end cap seals the other end of the storage chamber, and serves to apply a positive pressure on the cookie dough stored within the storage chamber for extruding or pushing a predetermined quantity of cookie dough from the storage chamber after the first end cap is removed.

The cookie dough dispenser of the present invention is "dual-functional", since it serves to both store cookie dough under refrigeration and to dispense a predetermined quantity of the cookie dough, as desired without handling the unused cookie dough. Moreover, as the piston is moved to dispense the cookie dough, the air-tight seal remains intact. Unlike flexible plastic wrap, the present cookie dough dispenser is an airtight container that eliminates odors and freezer burn normally encountered with plastic wrap. Additionally, the cookie dough is stored in a substantially rigid container which prevents flattening or other damage of the dough during storage in the refrigerator. Likewise, the present cookie dough dispenser can be easily cleaned and reused, and thus is environment-friendly.

According to one embodiment of the present invention, a piston rod is provided which is releasably attached to the surface of the piston opposite cookie dough storage chamber for manually applying pressure to the piston to dispense the dough as desired. Additionally, the piston rod can be removed from attachment to the piston and stored, if desired, on the outside of the housing of the cookie dough storage container by any suitable releasable attachment.

According to a further embodiment of the invention a method is provided for storing and refrigerating cookie dough which comprises providing a reusable cookie dough storage container/dispenser comprising a generally tubular, hollow member having a self-sustaining shape and a substantially uniform cross-section substantially along its entire length, and having a piston slidably received in the tubular member and axially movable therein along a longitudinal axis of the tubular member. The tubular member has at least a first end cap releasably received on a longitudinal end of the tubular member, such that the first end cap and the piston form a cookie dough storage chamber within the tubular member when spaced apart. The first end cap is removed from the longitudinal end of the tubular member and cookie dough is introduced into the cookie dough storage chamber. The first end cap is then replaced on the longitudinal end of the tubular member, so that the dough can be stored.

Next, the tubular member containing the cookie dough is refrigerated. When desired, the tubular member containing the dough is removed from refrigeration, and the first end cap is removed from the tubular member. A positive pressure is applied to the piston to extrude a predetermined amount of the cookie dough from the cookie dough storage chamber.

BRIEF DESCRIPTION OF THE DRAWINGS

Referring now to the drawings which form a part of the original disclosure.

DETAILED DESCRIPTION OF THE INVENTION

Figure 1:
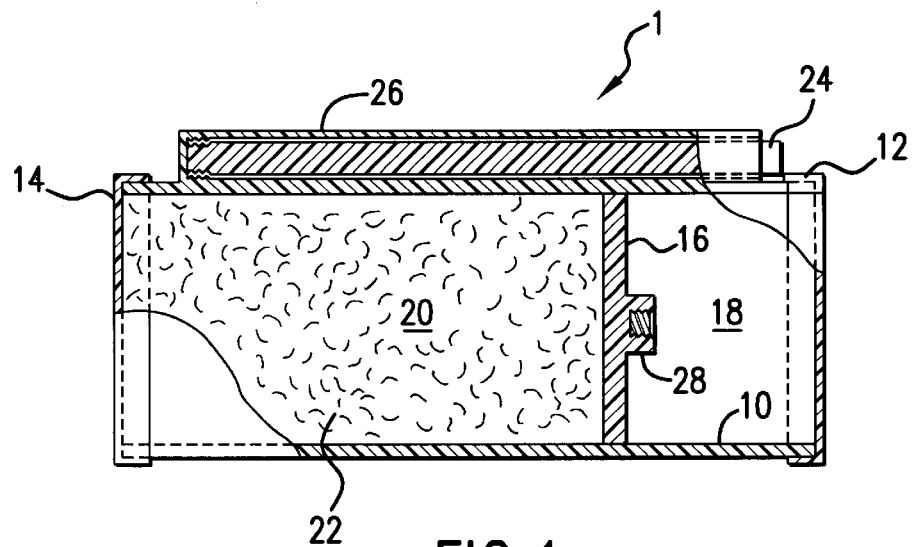
FIG. 1 is a side elevation view, partially in section, of an embodiment of the dough storage dispenser of the present invention in the storage mode.

Referring to the drawings, FIG. 1 illustrates a generally tubular cookie dough storage dispenser of the present invention in the storage mode.

In the embodiment of FIG. 1, the storage-dispenser 1 is shown having a generally tubular, outer wall 10 and end caps 12 and 14 to provide a hollow configuration. A piston or plunger 16 is snugly but slidably mounted within outer wall 10 to divide the storage-dispenser into a hollow chamber 18 and a hollow chamber 20. Hollow chamber 20 is shown filled with cookie dough 22. A piston rod 24 is provided in a storage housing 26 for later engagement with piston rod 16. Piston 16 is provided with a threaded housing member 28 for receiving the threaded end portion of piston 16.

Storage-dispenser 1 is preferably formed of a substantially rigid plastic material, such as polyethylene, polypropylene, polystyrene, or the like, so that storage-dispenser 1 has sufficient structural integrity to have a self-sustaining shape and enable the cookie dough to be stored in the freezer or sub-freezer sections of a refrigerator without the shape of the dough being affected, e.g., flattening, by other containers placed on or around storage-dispenser 1 under cold storage conditions, particularly prior to freezing of the dough. Although storage-dispenser 1 could be formed of metal, plastic is much preferred to avoid the metallic odors or taste that may be imparted to the cookie dough during cold storage of the dough.

Although use of end cap 12 is shown in FIG. 1 when storage-dispenser 1 is in the storage mode, piston 16 fits sufficiently snugly in outer wall 10 between chambers 18 and 20 and conforms to the internal configuration of wall 10 to adequately seal chamber 20 and the cookie dough therein from the odors encountered in the refrigerator and to avoid freezer burn, even if end cap 12 were not used. Thus, the use of end cap 12 may provide some additional sealing advantage, but its use is optional. End caps 12 and 14 are depicted as being held on outer wall 10 by means of a snap or interference fit. However, if desired, end caps 12 and 14 may be provided with a threaded connection with outer wall 10.

Figure 2:
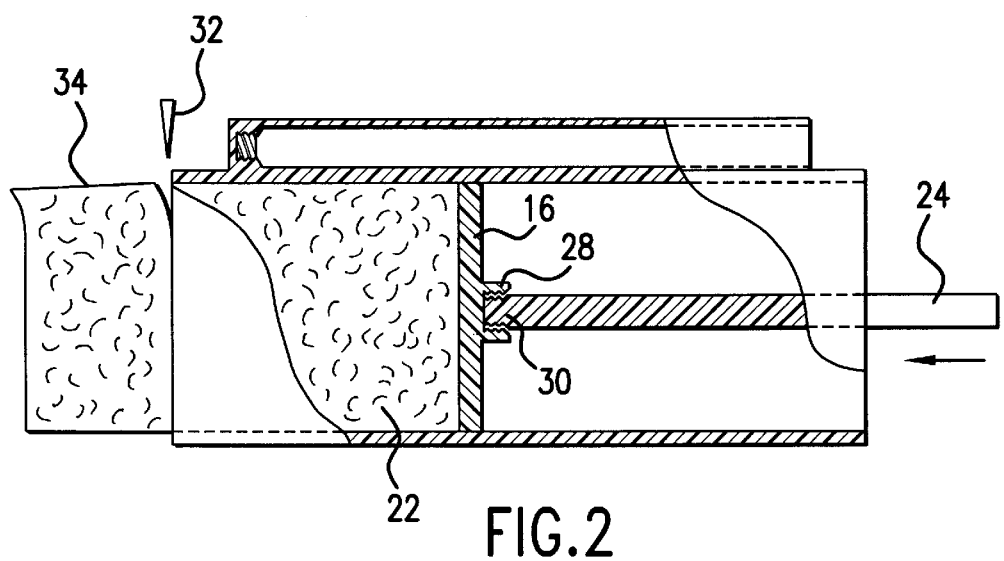
FIG. 2 is a side elevation view, partially in section, of the storage dispenser of FIG. 1 in the dispensing mode.

When desired, storage-dispenser 1 may be removed from the refrigerator or freezer compartment, and permitted to achieve ambient temperature for removal of the cookie dough from chamber 20. Piston rod 24 is removed from storage housing 26 and the end of piston rod 24 is inserted and threaded in threaded housing 28, as shown in FIG. 2, for use of storage-dispenser 1 in the dispensing mode. Although housings 26 and 28 are shown with internal threads for receiving the threaded end 30 of piston rod 24, such internal threads may be omitted. The internal threads of housing 26 engage the external end thread of piston rod 24 to secure piston rod 24 in the housing. However, the internal threads of housing 26 may be eliminated, so that piston rod 24 merely rests in housing 26. Likewise, the internal threads of housing 28 may be omitted, as may the end threads 30 of piston rod 24, since piston rod 24 will generally be used to provide force only in the direction of the arrow shown in FIG. 2, and not in the opposite direction to withdraw the piston. However, the use of a threaded or snap fit of the piston rod 24 in housing 28 may make cleaning of storage-dispenser 1 easier. If desired, end cap 12 may be provided with a center opening (not shown) approximately the diameter of piston rod 24, so as to leave piston rod 24 in place in housing 28 during cold storage. Of course, piston rod 24 may be left in housing 28 during storage, even without end cap 12, if desired.

As shown in FIG. 2, end cap 14 has been removed, and manual force has been applied to piston rod 24 in the direction shown to dispense cookie dough 22 from chamber 20, as depicted. Knife member 32 may then be used to cut or sever as much of the emerged or extruded cookie dough plug 34 as desired with the longitudinal end of outer wall providing a guide for knife member 32. The cookie dough plug may then be subdivided into individual portions of cookie size cookie dough, which are then baked to form individual cookies. Thus, cookie dough plug 34 has substantially the same shape after being severed from the dough in chamber 20 that it had when it was a part of the mass of cookie dough 22 in chamber 20. The remaining mass of cookie dough 22 may be re-refrigerated for later use by replacing end cap 14 and unscrewing and removing piston rod 24, which may be replaced in housing 26. If desired, end cap 12 may be snapped on for added sealing purposes.

Storage-dispenser 1 is particularly useful as a personal gift package in which one can personally prepare cookie dough and place it in storage container 1 to provide a gift package of homemade cookie dough with one's own special recipe. The recipient of the gift can then dispense as much or as little of the dough as desired to make, for example, a few chocolate chip cookies, and refrigerate the remainder of the cookie dough.

While special reference has been made to the dough stored in storage-dispenser 1 as "cookie" dough, it is contemplated that the cold storage-dispenser 1 of the present invention can be used for other forms of dough, if desired.

Figure 3:
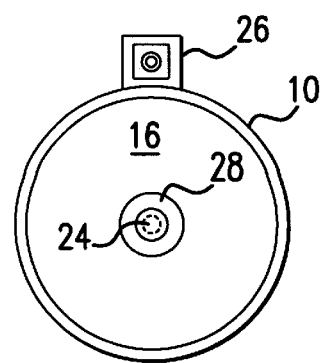
FIG. 3 is an end elevational view of the storage dispenser of FIG. 2.

FIG. 3 is an end view of FIG. 2 with piston rod 24 inserted in housing 28 of piston 16 for dispensing the cookie dough from storage-dispenser 1. As shown in FIG. 3, the outer wall 10 of storage-dispenser 1 has a generally circular cross-section, while piston rod storage housing 26 has a generally rectangular cross-section. However, it should be understood that outer wall 10 of storage-dispenser 1 may have any geometric cross-section desired other than being circular. Thus, outer wall 10 may be, for example, rectangular, hexagonal, octagonal, triangular, etc., if desired, for storage or other purposes. The circular cross-section of outer wall 10 is preferred for cleaning purposes. Thus, the expression "tubular" as used in the present specification encompasses any and all such cross-sections. Likewise, storage housing 26 may have any desired cross-section, as well. Moreover, if desired, storage housing 26 may be replaced with another piston rod securing means for removably attaching piston rod 24 to storage-dispenser 1. Thus, if desired, piston rod 24 may be secured to outer wall 10 by means of a snap fitting or a Velcro attachment to both outer wall 10 and piston rod 24, or any other means of removably attaching piston rod 24 to outer wall 10 for storage purposes.

While several embodiments have been shown to illustrate the invention, it will be understood by those skilled in the art that various changes and modifications can be made therein without departing from the scope of the invention as defined in the appended claims.

What is claimed is:

1. A reusable cookie dough storage container for storing and refrigerating cookie dough comprising:

a generally tubular, hollow member having a self-sustaining shape and a substantially uniform cross-section substantially along its entire length, a piston slidably received in said tubular member and axially movable therein along a longitudinal axis of said tubular member, said piston having a diameter substantially equal to the inner diameter of said tubular member, said tubular member having at least a first end cap releasably received on a longitudinal discharge end of said tubular member, such that said first end cap and said piston form a substantially sealed cookie dough storage chamber for refrigerating said cookie dough within said tubular member when spaced apart, said longitudinal end being reclosable by said first end cap, said piston adapted to substantially seal said storage chamber containing cookie dough, when used in combination with said first end cap to refrigerate said cookie dough, and to apply a positive pressure on said cookie dough stored within said tubular member for extruding said cookie dough from said discharge end of said tubular member when said first end cap is removed, said discharge end of said tubular member having an opening of a diameter substantially equal to the diameter of said piston.

2. The storage container of claim 1, wherein said piston has a first surface and an opposite second surface, said first surface of said piston facing said discharge end of said tubular member and said second surface of said piston having a piston rod releasably connected to said piston for applying pressure to said piston to extrude cookie dough from said discharge end of said tubular member.

3. The storage container of claim 1, wherein said tubular member is provided with a second end cap releasably received on the longitudinal end of said tubular member opposite said first end cap.

4. The storage container of claim 1, wherein said piston rod is releasably attached for storage to an outer surface of said tubular member.

5. A method for storing and dispensing refrigerated cookie dough which comprises:

providing a reusable cookie dough storage container comprising a generally tubular, hollow member having a self-sustaining shape and a substantially uniform cross-section substantially along its entire length, and having a piston slidably received in said tubular member and axially movable therein along a longitudinal axis of said tubular member, said tubular member having at least a first end cap releasably received on a longitudinal discharge end of said tubular member, such that said first end cap and said piston form a substantially sealed cookie dough storage chamber within said tubular member when spaced apart, removing said first end cap from said longitudinal discharge end of said tubular member and introducing cookie dough into said cookie dough storage chamber, and replacing said first end cap on said longitudinal discharge end of said tubular member, such that said cookie dough is stored between said end cap and said piston in a substantially sealed condition, refrigerating said tubular member containing said cookie dough, and thereafter removing said tubular member from refrigeration, removing said first end cap from said tubular member, and applying a positive pressure to said piston in the direction of said storage chamber to dispense said dough from said cookie dough storage chamber in a predetermined amount.

6. The method of claim 5, wherein said first end cap is replaced on said tubular member to seal remaining dough in said tubular member, and said tubular member is refrigerated.

7. The method of claim 5, wherein said piston has a first surface and an opposite second surface, said first surface facing said first end cap, and a piston rod is releasably received by said second surface to manually apply said positive pressure to said piston for extruding said dough from said tubular member.

8. The method of claim 5, wherein said dough is cookie dough and is dispensed in the form of a cookie dough plug, and said plug is thereafter subdivided into a plurality of cookie dough forms, which are thereafter baked to form cookies.

9. A reusable cookie dough storage container for storing and refrigerating cookie dough comprising:

a generally tubular, hollow member having a self-sustaining shape and a substantially uniform cross-section substantially along its entire length, a piston slidably received in said tubular member and axially movable therein along a longitudinal axis of said tubular member, said piston having a diameter substantially equal to the inner diameter of said tubular hollow member, said tubular member having at least a first end cap releasably received on a longitudinal end of said tubular member, such that said first end cap and said piston form a substantially sealed cookie dough storage chamber for refrigerating said cookie dough within said tubular member when spaced apart, said longitudinal end being reclosable solely by said first end cap, said piston adapted to substantially seal said storage chamber containing cookie dough, when used in combination with said first end cap to refrigerate said cookie dough, and to apply a positive pressure on said cookie dough stored within said storage chamber for extruding said cookie dough from the discharge end of said storage chamber when said first end cap is removed, said discharge end of said storage chamber having an opening of a diameter substantially equal to the diameter of said piston.

10. The storage container of claim 9, wherein said piston communicates with a piston rod within said tubular member for moving said piston towards said longitudinal discharge end of said storage container.

11. The storage container of claim 10, wherein said piston rod is releasably removable from said piston.

12. The storage container of claim 1, wherein said tubular member is provided with a second end cap releasably received on a second longitudinal end of said tubular member opposite said discharge end of said tubular member to substantially seal said cookie dough chamber between said piston and said second longitudinal end of said tubular member.

13. The method of claim 5, wherein the dough extruded from said longitudinal discharge end of said tubular member is severed from the dough remaining in the cookie dough storage chamber by applying a knife to the dough using the outer wall of said discharge end of said tubular member as a guide for said knife.

14. The method of claim 7, wherein said piston rod is removed from said piston and releasably attached to an outer surface of said tubular member prior to refrigerating said remaining dough.

15. The method of claim 14, wherein said removed piston rod is inserted into a housing affixed to an outer surface of said tubular member.

16. The method of claim 5, wherein said dispensed dough is dispensed in a plug having a diameter substantially equal to the diameter of said piston.

17. A reusable cookie dough storage container for storing and refrigerating cookie dough comprising:

a generally tubular, hollow member having a self-sustaining shape and a substantially uniform cross-section substantially along its entire length, a piston slidably received in said tubular member and axially movable therein along a longitudinal axis of said tubular member, said piston having a diameter substantially equal to the inner diameter of said tubular member, said tubular member having at least a first end cap releasably received on a longitudinal discharge end of said tubular member, such that said first end cap and said piston form a substantially sealed cookie dough storage chamber for refrigerating said cookie dough within said tubular member when spaced apart, said longitudinal end being reclosable by said first end cap, said piston having a first surface and an opposite second surface, said first surface of said piston facing said discharge end of said tubular hollow member and said second surface of said piston having a piston rod releasably connected to said piston for applying pressure to said piston to extrude cookie dough from said discharge end of said hollow member, said piston adapted to substantially seal said storage chamber containing cookie dough, when used in combination with said first end cap to refrigerate said cookie dough, and to apply a positive pressure on said cookie dough stored within said storage chamber for extruding said cookie dough from said discharge end of said storage chamber when said first end cap is removed, said discharge end of said storage chamber having an opening of a diameter substantially equal to the diameter of said piston, said tubular member being provided with a second end cap releasably received on a second longitudinal end of said tubular member opposite said discharge end to substantially seal said cookie dough chamber between said piston and said second longitudinal end of said tubular member, said tubular member being provided with a piston rod housing member coupled to an outer surface of said tubular member for receiving said piston rod for storage of said piston rod, said piston rod housing member having an internal thread for engaging an external thread on said piston rod.

* * * * *